Patented June 11, 1935

2,004,796

UNITED STATES PATENT OFFICE 2,004,796

METHOD OF CLEANING FILTER SCREENS

Elmer H. Payne, Wood River, Ill., assignor to Standard Oil Company (Indiana), Chicago, Ill., a corporation of Indiana No Drawing. Application December 14, 1933, Serial No. 702,361

7 Claims. (Cl. 210—62)

This invention relates to a method of treating filter screens and is particularly concerned with a method for removing carbonaceous and other materials from filter screens such as are used in the filtration of tars resulting from the cracking of hydrocarbon oils.

For example, in the conversion or cracking of hydrocarbon oils it is a practice in some instances to control the operation so as to produce a residual product consisting principally of tar. In addition the residual product commonly contains substantial quantities of entrained solids such as coke and semi-solid tacky material of the nature of asphalts which are formed during the cracking operation. The residual or tar product may also contain certain additional solid constituents resulting from employing in the cracking operation certain solid reagents, such as lime, for example, and the solid reaction products thereof such as calcium sulphide.

In order therefore to produce a tar product of the desired purity for commercial use it has been a practice to pass the hot residual products from the cracking operation, and while still under considerable pressure, through a filter press built up of a plurality of superimposed metallic screens. During the filtration the solids accumulate on the screen until a point is reached when the filtering is so slow that further filtration is no longer economically feasible. The filtering operation is then stopped and the filter press, after being allowed to cool somewhat, usually hastened by steaming, to prevent possible spontaneous ignition of the products upon exposure to air, is opened and the cake is discharged. This operation is repeated as long as satisfactory filter rates are obtained, but eventually the screens become "plugged" and must be removed and cleaned of their accumulated deposit or discarded.

It commonly happens, however, that the final layer of the deposit in direct contact with the screen so firmly adheres thereto that it is extremely difficult to effect the desired cleaning, and, in the more extreme, but not uncommon, cases, it has been found more practical to discard the screens rather than attempt to remove this final layer of adherent material, by any of the methods heretofore known.

The principal object of the present invention is to provide a method for economically and expeditiously removing this firmly adherent material from filter screens.

It has been found that this solid material which adheres so tenaciously is made up of particles of solid matter in a tacky asphalt-like matrix which forms a binding agent for the other solid matter, and that by treating the screen so as to destroy the adhesive properties of the asphalt material the screens can be readily cleaned.

In accordance with the invention the screen, after being removed from the filter press, is first brushed and scraped to remove the loosely adherent material and the screen is then baked at a carefully controlled temperature. This baking operation tends to destroy the binding properties of the tacky asphaltic material. If desired, this baking operation may be effected over an open flame in which case it is essential to maintain a reducing flame in order to prevent oxidation of the metal forming the screen. The baking operation may be continued until all the combustible materials have been ignited, after which the non-combustible materials may be readily removed.

In carrying out this invention it is preferred to have the screens mounted in non-combustible frames, preferably steel, so that it is not necessary to remove the filter cloth from the frame. In the preferred operation the plugged filter plates are placed in a suitable oven and gradually heated to 750–850° F. to remove volatile matter. This step is carried out by maintaining the temperature of the screens below the kindling temperature of the binding material, in addition to which the oxygen concentration is maintained sufficiently low so that active combustion cannot take place. If active combustion occurs during the period when considerable volatile matter is present on the screen surface there is danger of overheating and destruction of the fine wire of which it is made, particularly in the case of iron screens. This drying operation may require from 6 to 8 hours to completely remove volatile matter but this time may be shortened by the use of higher temperatures and still lower oxygen concentration.

When the volatile matter has been removed the temperature of the plates is gradually raised to a maximum of about 1200° F., although higher temperatures may be used for alloy screens which are more resistant to oxidation. The oxygen concentration is maintained at a point where combustion of the carbonaceous material remaining on the screens takes place very slowly. This can be accomplished by proper regulation of draft to the oven. This step requires usually from three to four hours. At the end of this time the screens are cooled and the soft ash which remains on them can be readily brushed off. The temperature required for combustion of the carbonaceous material which acts as a binder in plugging the interstices of the screens may be materially reduced by the use of certain catalysts such as copper and lead salts and particularly copper chloride. An aqueous solution of copper chloride may be applied by spraying to the surface of the screen before it is introduced into the baking oven or the copper chloride may be volatilized in the flame supplying heat to the oven, preferably after the volatile matter has been driven off from the screens. In this way the catalyst is distributed uniformly over the surface of the carbonaceous material on the screens and accelerates its combustion, making it possible to reduce the temperature of combustion by several hundred degrees F. If desired, the copper and/or chlorine may be employed in an oil soluble form to facilitate spraying on the surface of the plugged filter leaves, for example, the copper may be employed as a copper rosin soap or naphthenic or fatty acid salt, and the chlorine may be employed in the form of chlorinated paraffin wax, dichlor diethyl ether, etc. On heating an interaction takes place between these materials to produce copper chloride in situ.

When screens are made of iron, steel, or other oxidizable metal, it is essential to carefully regulate the temperature conditions and to maintain a non-oxidizing and preferably a reducing atmosphere about the screens so as to prevent oxidation of the metal. Where the screens are constructed of stainless steel (18% chromium—8% nickel alloy) or other oxidation resistant alloys considerably more latitude is afforded in the baking operation, allowing the use of higher temperatures and oxygen concentrations; consequently the operation may be considerably hastened and filter plates returned to service in shorter time. Furthermore, the higher initial cost of alloy screens makes it imperative that they be retained in service for a longer time before discarding and this invention provides a method for cleaning such screens when it would otherwise be necessary to replace them.

While the preferred embodiment has been disclosed for purposes of illustration it is understood that various modifications and variations thereof may be made without departing from the scope and spirit of the invention and that no limitations are to be embodied except as necessary to distinguish from prior art.

What I claim is:

1. A method of cleaning an incombustible filter screen employed in the filtration of tarry material containing combustible binding ingredients which comprises baking the screen to a temperature sufficient to decompose the combustible binder.

2. A method of cleaning an incombustible filter screen of an agglomerate containing a carbonaceous binding material which comprises baking said screen to a temperature sufficient to decompose said carbonaceous binder in a non-oxidizing atmosphere.

3. A method of removing an agglomerated material containing a combustible binder from an incombustible filter screen employed in the filtration of tarry products resulting from the cracking of hydrocarbon oils which comprises heating said screen in a non-oxidizing atmosphere to a temperature sufficient to decompose said combustible binder and to destroy its binding properties.

4. A method of removing an agglomerated material containing a combustible binder from an incombustible filter screen employed in the filtration of tarry products which comprises heating said screen to a temperature sufficient to ignite said combustible binder and to thereby destroy its binding properties.

5. The method of cleaning metallic filter screens which have become plugged with carbonaceous material, comprising initially heating said screens in an inert atmosphere to expel the volatile matter, further heating said screens at a higher temperature in an atmosphere of controlled oxygen concentration whereby said carbonaceous material is destroyed and thereafter cooling said screens and removing the loosely adherent residual ash.

6. The method of cleaning metallic filter screens according to claim 5 wherein the temperature of removing volatile material is maintained below 850° F. and the temperature of combustion of carbonaceous matter is maintained below 1200° F.

7. The method of cleaning metallic filter screens which have become plugged with carbonaceous material, comprising treating with a catalyst selected from the class consisting of copper and lead compounds, and thereafter subjecting said screens to controlled oxidation in an oven whereby the carbonaceous material is destroyed at a relatively low temperature and the residual ash may be easily removed from the interstices of the screen.

ELMER H. PAYNE.